US008681242B2

(12) United States Patent
Ohbuchi et al.

(10) Patent No.: US 8,681,242 B2
(45) Date of Patent: Mar. 25, 2014

(54) IMAGE SIGNAL PROCESSING SYSTEM (75) Inventors: Mari Ohbuchi, Yokohama (JP);
Hirotomo Sai, Yokohama (JP); Tsutomu Usui, Yokohama (JP); Shinichiro Hirooka, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 320 days.

(21) Appl. No.: 13/152,337

(22) Filed: Jun. 3, 2011

(65) Prior Publication Data

US 2011/0317030 A1 Dec. 29, 2011

(30) Foreign Application Priority Data

Jun. 24, 2010 (JP) .................................. 2010-143337

(51) Int. Cl.
G06K 9/40 (2006.01)
H04N 5/235 (2006.01)
H04N 5/228 (2006.01)
H04N 9/73 (2006.01)

(52) U.S. Cl.
USPC .................. 348/229.1; 348/222.1; 348/223.1; 382/274

(58) Field of Classification Search
USPC ............. 348/222.1, 229.1, 362–368; 382/274
See application file for complete search history.

(56) References Cited

U.S. PATENT DOCUMENTS

| | | | |
|---|---|---|---|
| 7,315,657 B2 * | 1/2008 | Matsushima | 382/274 |
| 8,106,965 B2 * | 1/2012 | Shimizu | 348/234 |
| 8,154,628 B2 * | 4/2012 | Ishida et al. | 348/241 |
| 8,310,726 B2 * | 11/2012 | Enjuji | 358/3.01 |
| 2008/0043120 A1 | 2/2008 | Mitsunaga | |
| 2009/0322775 A1 | 12/2009 | Fukuda | |
| 2010/0020205 A1 * | 1/2010 | Ishida et al. | 348/241 |
| 2010/0027072 A1 * | 2/2010 | Enjuji | 358/3.01 |
| 2010/0054604 A1 * | 3/2010 | Kurokawa | 382/190 |

FOREIGN PATENT DOCUMENTS

| | | |
|---|---|---|
| JP | 2009-65711 | 3/2009 |
| JP | 2010-009420 | 1/2010 |

OTHER PUBLICATIONS

JP Office Action for Japanese Application No. 2010-143337, issued on Nov. 12, 2013.

* cited by examiner

*Primary Examiner* — Timothy J Henn
*Assistant Examiner* — Pritham Prabhakher
(74) *Attorney, Agent, or Firm* — Antonelli, Terry, Stout & Kraus, LLP.

(57) ABSTRACT

An image signal processing system according to the present invention has a function to perform image quality control in photographing a subject having a large difference in brightness in the surrounding environment so that the entire photographed image, in particular a subject which a user desires to view, has an adequate brightness and an adequate gradation. Specifically, this image signal processing system comprises: a video input unit, a video signal processing unit for performing signal processing on a signal output from the video input unit, and generating a video signal; an input-output characteristic control unit for controlling a characteristic of the video signal which the video signal processing unit generates; and a subject recognition unit for performing image processing on the video signal which the video signal processing unit generates, and recognizing and detecting subject information.

18 Claims, 9 Drawing Sheets

IMAGE SIGNAL PROCESSING SYSTEM

INCORPORATION BY REFERENCE

The present application claims priority from Japanese application JP2010-143337 filed on Jun. 24, 2010, the content of which is hereby incorporated by reference into this application.

BACKGROUND OF THE INVENTION

The present invention relates to image signal processing systems, and in particular relates to an image signal processing system correcting the brightness of an image which is photographed in a scene having a large difference in brightness.

Examples of the related art in this technical field include JP-A-2009-65711 (see the abstract). The subject of JP-A-2009-65711 is to correct the brightness of an input image so that an area having a local difference in brightness becomes distinct without uniformly using a photometry frame. As a solution of this subject, there was provided an image processing system, in which the photometry evaluation section 350 generates a photometry evaluation value indicative of the evaluated brightness of an image signal; the luminance area generation section 361 calculates a dark-side foot value and a bright-side foot value in the luminance distribution of an image with the average luminance in block; the spline generation section 362 handles the photometry evaluation value as the average luminance value and furthermore uses the dark-side foot value and the bright-side foot value to generate a tone curve by a spline curve; the gradation compression section 380 compresses the gradation of the luminance value based on the tone curve; the contrast correction section 390 corrects the contrast of the luminance value whose gradation has been compressed; and the gradational correction processing section 320 corrects the gradation of a pixel value of a non-linearly transformed RGB image based on the luminance value whose contrast has been compressed.

SUMMARY OF THE INVENTION

In photographing with a digital video camera or a still camera, exposure is often automatically controlled with a mechanism called AE (Auto Exposure) so as to provide for an adequate brightness of a photographed image. However, in photographing a subject having a large difference in brightness in the surrounding environment, it is difficult to control the exposure only by the AE so that the entire photographed image may have an adequate brightness and an adequate gradation. One of the approaches for solving this is an approach for correcting the luminance to provide the entire image with an adequate brightness and an adequate gradation. For example, in the above-described JP-A-2009-65711, the adequate brightness of the image is realized by correcting the luminance for each subject, whereby a subject having a relatively low reflectivity as compared with its environment is reproduced darker while a subject having a relatively high reflectivity as compared with its environment is reproduced brighter.

However, in the method described in JP-A-2009-65711, a control corresponding to the shape of the subject cannot be carried out because the contrast correction is performed for each area divided in units of blocks and because the effect of the contrast correction is in units of square blocks. For this reason, when a block is crossing a subject, the brightness of the subject may become discontinuous on a boundary between the block and the subject.

So, the present invention provides, in such control to allow the entire image to have an adequate brightness and an adequate gradation, an image signal processing system which recognizes and detects a specific subject, such as a person or a substance, and performs image processing using the result in addition to luminance distribution information and thereby expands the gradation of the subject that a user desires to view, and facilitates visibility. This can improve the visibility of the subject that the user desires to view.

All or a part of the above-described problems are solved or improved by the configurations in the scope of the claims, by way of example, in the present invention.

More specifically, the present invention provides an image signal processing system which, for example in photographing a subject having a large difference in brightness in the surrounding environment, controls so that the entire photographed image, particularly a subject that the user desires to view, has an adequate brightness and an adequate gradation.

According to the present invention, even in photographing the subject having the large difference in brightness in the surrounding environment, the entire photographed image, particularly the subject that the user desires to view, can be photographed in the adequate brightness and adequate gradation.

The subjects, units, and effects other than the above-described ones will be clarified by the later-described examples.

DETAILED DESCRIPTION OF THE EMBODIMENTS

Hereinafter, examples of the present invention will be described with reference to the accompanying drawings.

(1) System Configuration

Figure 1:
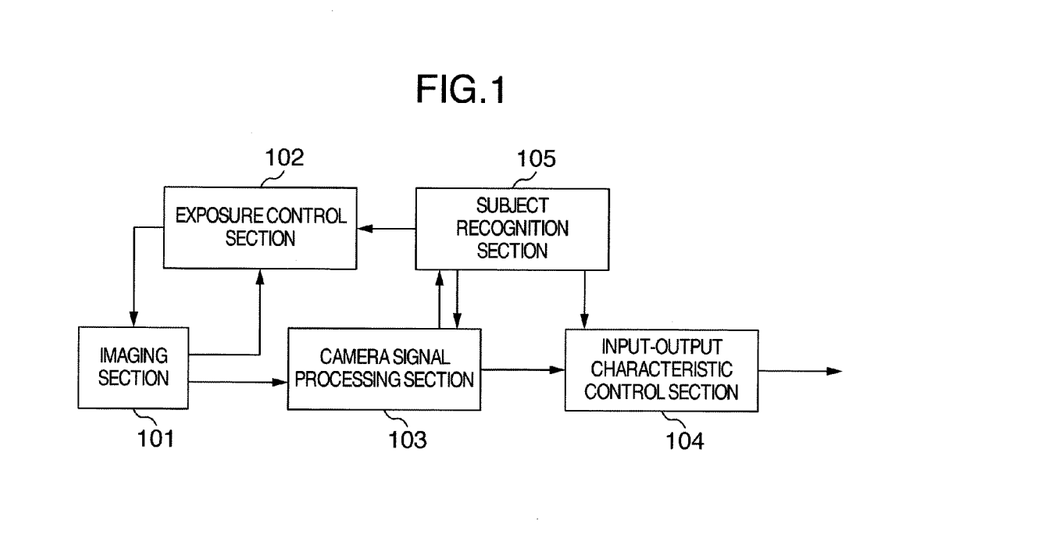
FIG. 1 is a diagram illustrating an example of a system configuration.

FIG. 1 is a diagram representing an example of a system configuration to which the present invention is applied. This system comprises an imaging section 101, an exposure control section 102, a camera signal processing section 103, an input-output characteristic control section 104, and a subject recognition section 105. The imaging section 101 comprises a lens group including a zoom lens and a focus lens, a shutter, an iris, an image sensor, an AGC (Automatic Gain Control) unit, an AD (Analog to Digital) converter, and the like, and receives light incident from the lenses by the image sensor and photoelectrically converts the acquired optical image and outputs resultant electrical signals. The exposure control section 102 acquires luminance distribution information from the signal which the imaging section 101 output, and determines a target exposure based on this luminance distribution information and subject information which the later-described subject recognition section 105 outputs, and controls the aperture of the iris, the shutter speed, and the gain of AGC so that the actual exposure comes closer to this target exposure. The camera signal processing section 103 generates a video signal by performing, on the signal which the imaging section 101 outputs, various digital signal processings such as a separation processing to separate the signal into a luminance signal and a chrominance signal, a brightness correction processing, a gamma correction processing or color-difference conversion processing, a white-balance correction processing, and a digital zoom processing, and outputs the video signal to the input-output characteristic control section 104 or the subject recognition section 105. For the coefficients used in performing each signal processing such as a brightness correction amount and a gamma correction amount, values stored in advance in an EEPROM or the like may be used or the correction amount may be varied in accordance with the various information such as a video luminance distribution or the subject information which the later-described subject recognition section 105 outputs. The input-output characteristic control section 104 performs an input-output characteristic control using the video signal, which the camera signal processing section 103 outputs, as an input. For example, an image is divided into an arbitrary number of small areas and the gamma characteristic is controlled for each small area. The subject recognition section 105 performs an image recognition processing on a video image which the camera signal processing section 103 outputs, and detects specific subjects and then outputs the number of the subjects, the location of each subject in the video image, luminance distribution information, color information, the reliability of the subject, and the like, as the subject information. The subject may be whatever detectable by the image recognition, such as a face, a person, or a dynamic body. Using this subject information, the exposure control section 102 can control the target exposure of the imaging section, and the camera signal processing sections 103 can control the gamma characteristic or the like with respect to the entire image. The input-output characteristic control section 104 can control the input-output characteristic or the like for each small area, respectively, so that the brightness and gradation optimized for the specific subject can be provided. The small area in the input-output characteristic control section 104 in the above-described example can be specified by an arbitrary size or shape of one pixel unit, and additionally may be specified by the unit of subpixels so as to control the input-output characteristic. Note that, the exposure control processing of the exposure control section 102, the camera signal processing of the camera signal control section 103, the input-output characteristic control processing of the input-output characteristic control section 104, and the subject recognition processing of the subject recognition section 105 are usually performed by a microcomputer, a camera signal processing LSI (Large Scale Integration), an FPGA (Field Programmable Gate Array), or the like in a camera. Moreover, in the above-described example, the input-output characteristic control section 104 is a separate block from the camera signal processing section 103, however the input-output characteristic control section 104 of course may be incorporated into the camera signal processing section 103. In the example of the system configuration of FIG. 1, neither a user interface nor an LCD monitor is illustrated, however, the system configuration shall include all the constituent elements of an ordinary video camera or a still camera.

(2) Input-Output Characteristic Control Using Subject Recognition

Figure 2:
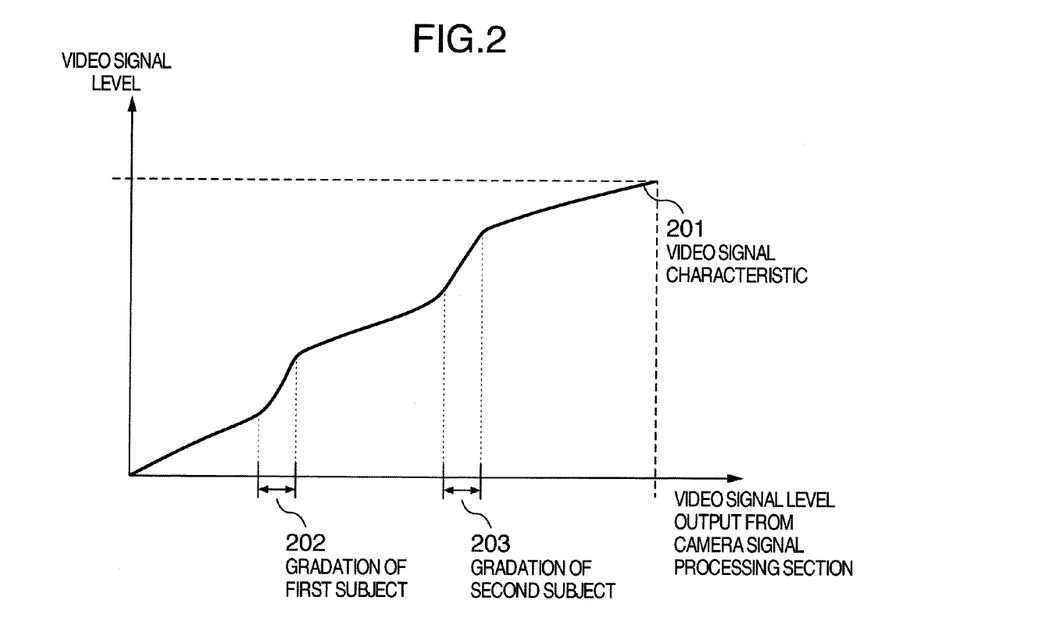
FIG. 2 is a graph illustrating an example of an input-output characteristic control using subject recognition.

FIG. 2 is a graph representing an example of the input-output characteristic control using subject recognition. Here, an imaging device performing gradation control is described as an example. The input-output characteristic control is carried out by the input-output characteristic control section 104. In FIG. 2, the horizontal axis represents the video signal level which the camera signal processing section 103 outputs, the vertical axis represents the video signal level after a luminance correction, and a reference numeral 201 indicates a video signal characteristic. In the example of FIG. 2, two persons are photographed as the subjects, wherein the characteristic conversion processing of a nonlinear signal is performed so that both a first subject 202 and a second subject 203 can have a wide gradation. With the above-described units, the gradation of the face of the person on the video is expanded so that the visibility of the person can be improved.

Figure 3:
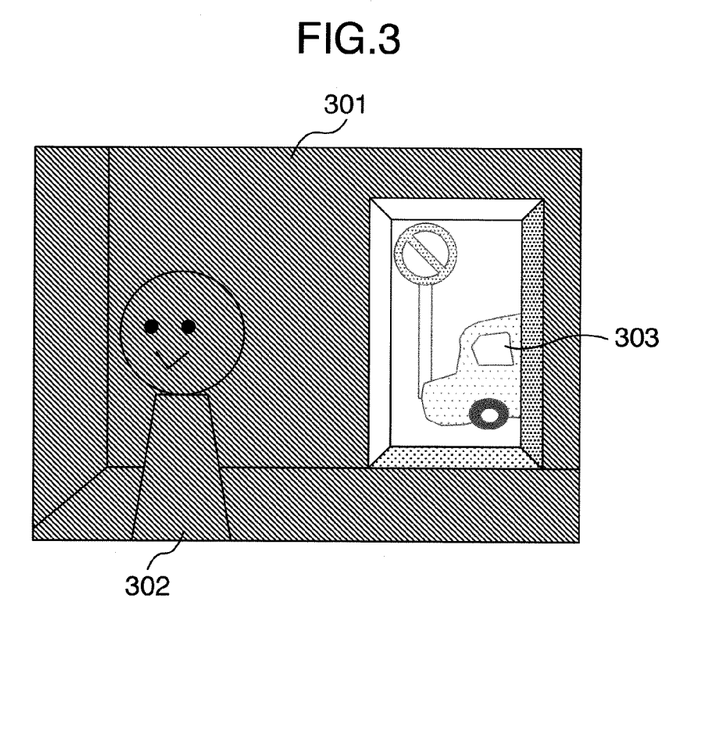
FIG. 3 is a view illustrating an effect of the input-output characteristic control using subject recognition.
Figure 4:
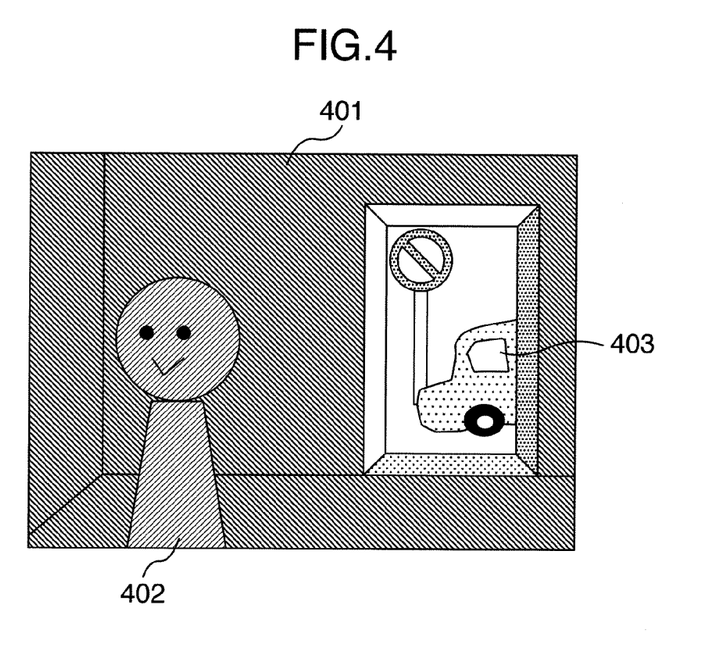
FIG. 4 is a view illustrating an effect of the input-output characteristic control using subject recognition.
Figure 5:
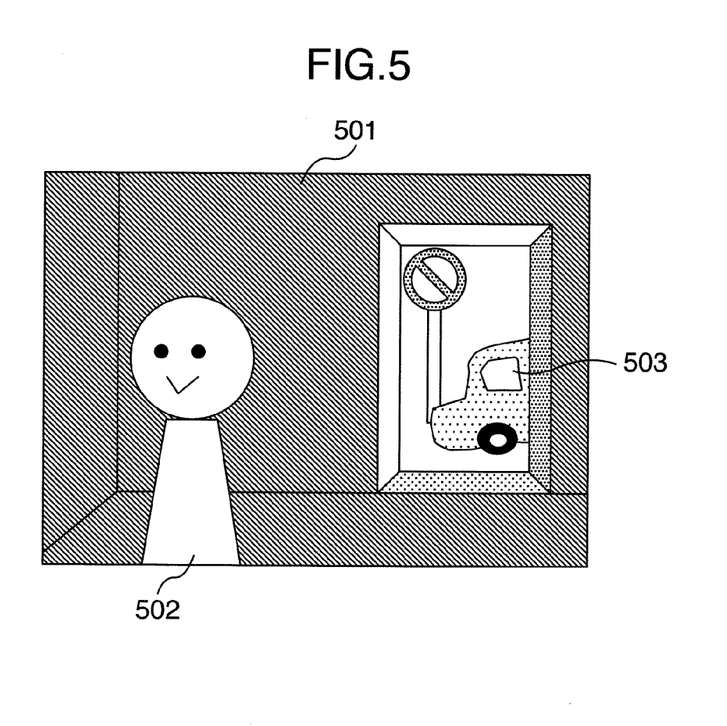
FIG. 5 is a view illustrating an effect of the input-output characteristic control using subject recognition.

FIG. 3 to FIG. 5 are views illustrating an effect of the input-output characteristic control using subject recognition. FIG. 3 illustrates a state where a user attempts to photograph a person 302 in a dark room 301 while the outdoors 303 is simultaneously viewed, and therefore, as a result of exposure control by the AE of the exposure control section 102, both the person 302 and the outdoors 303 lack gradation. FIG. 4 represents a state where an ordinary contrast correction has been applied. This increases the gradation of the person 402 and outdoors 403. However, since the gradation is allocated to both the person and the outdoors, gradation in such a degree that the person can be clearly viewed is not obtained. FIG. 5 represents a state where the processing of the input-output characteristic control section 104 is applied. Since the person is recognized by the subject recognition section 105 and the control of the input-output characteristic is performed using the result in the input-output characteristic control section 104, the gradation is allocated to the person and the visibility of the person can be improved. In this example, in the input-output characteristic control, the image is divided into small areas and the gradation control is performed for each area. Moreover, the size of this area or the amount of the input-output characteristic control is varied according to the result of subject recognition. For example, in performing the input-output characteristic control on the entire recognized subject, the gradation is expanded with respect to the area having a size enough to encompass the entire subject. Thus, the boundary of the area will never overlap with the subject and therefore the gradation of the subject does not become discontinuous and a natural image can be output.

Next, the amount of expansion of the gradation in the input-output characteristic control section is described. The gradation expansion amount with respect to a subject may be determined in accordance with a distance from the center of a screen of this subject. Generally, the closer to the center of the screen the subject is located, the more improvement in the visibility may be expected, and therefore, by performing the expansion of gradation in accordance with the distance from the center of the screen, the user is more likely to obtain the desired result. Other than this, the gradation expansion amount may be determined in accordance with the size of the subject. Generally, the larger the subject becomes, the more improvement in the visibility may be expected, and therefore, by performing the expansion of gradation in accordance with the size of the subject, the user is more likely to obtain the desired result. Of course, both the distance from the center of a screen and the size of the subject may reflect on the gradation expansion amount.

The above-described unit can improve the visibility of the subject.

Figure 6:
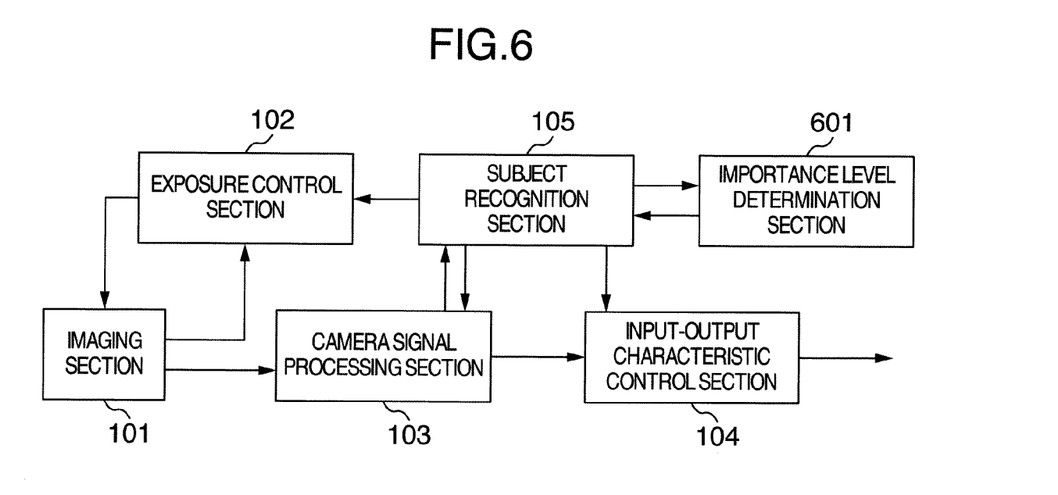
FIG. 6 is a diagram illustrating an example of a system configuration for realizing the input-output characteristic control in accordance with the level of importance.

(3) Input-Output Characteristic Control in Accordance with the Level of Importance FIG. 6 is a diagram illustrating an example of a system configuration for realizing the input-output-characteristic control in accordance with the level of importance. An importance level determination section 601 is a block for determining, in a scene in which a plurality of persons are viewed, a person whose visibility is desired to be increased with priority. The examples of a method of determining the level of importance include (A) a method of determining the level of importance in accordance with a set value which a user sets using a user interface and (B) a method of determining the level of importance using the subject information which the subject recognition processing section outputs. The details of each method are described below.

Figure 7:
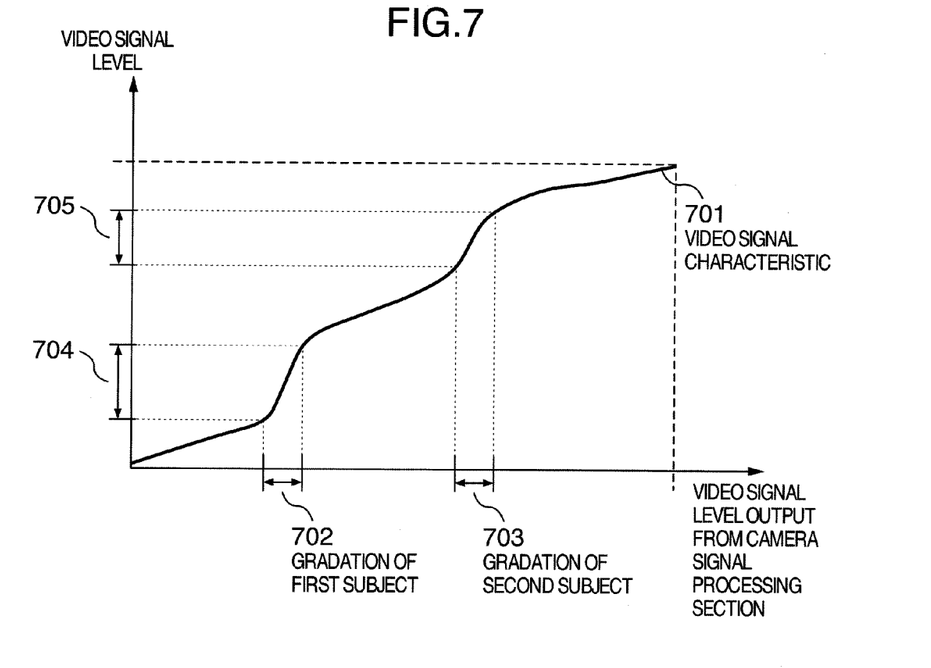
FIG. 7 is a graph illustrating an example of the input-output characteristic control in accordance with the level of importance.

FIG. 7 is a graph illustrating an example of the input-output characteristic control in accordance with the level of importance. If the user sets the level of importance of a first person low and the level of importance of a second person high, then a gradation expansion amount 704 of the first subject can be expanded and a gradation expansion amount 705 of the second subject whose level of importance is set low can be minimized.

Figure 8:
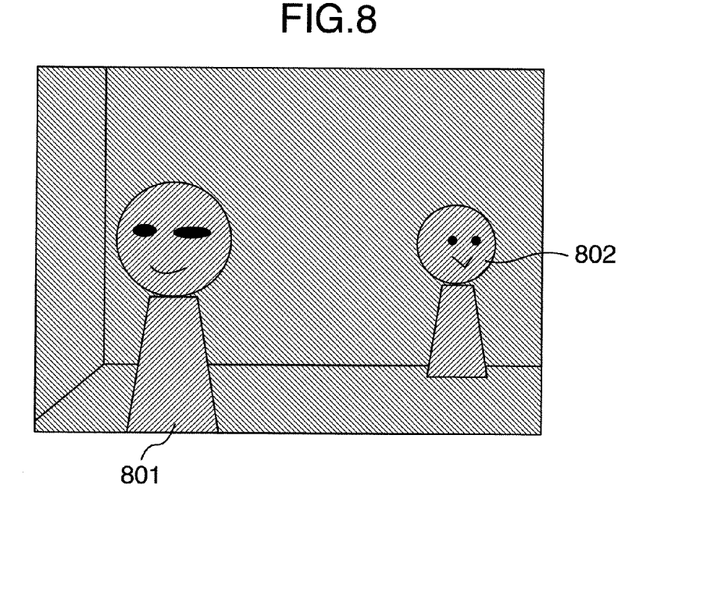
FIG. 8 is a view illustrating an effect of the input-output characteristic control in accordance with the level of importance.
Figure 9:
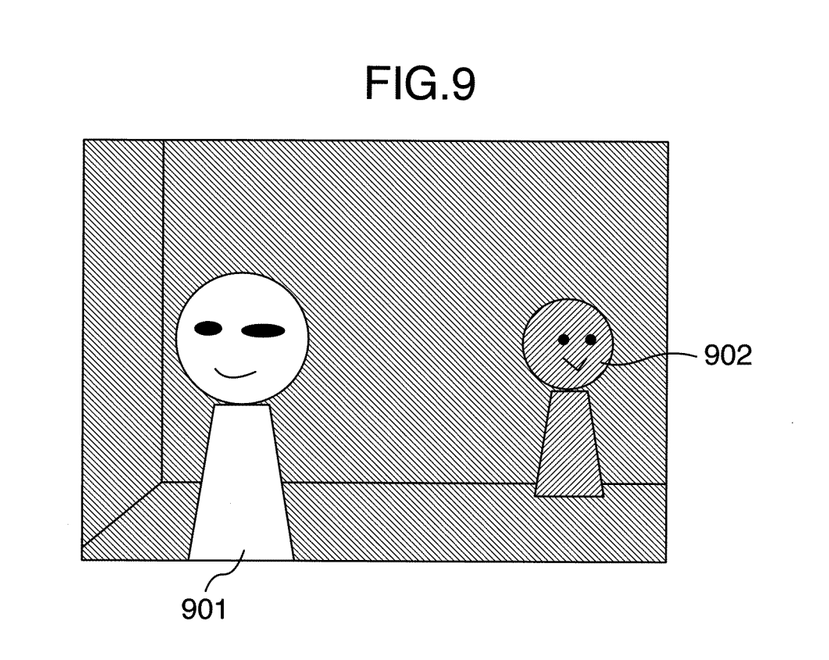
FIG. 9 is a view illustrating an effect of the input-output characteristic control in accordance with the level of importance.

Using FIG. 8 and FIG. 9, an effect of the input-output characteristic control in accordance with the level of importance is described. FIG. 8 illustrates a state where the gradations of both a first person 801 and a second person 802 are expanded by the input-output characteristic control section 104 and the subject recognition section 105. Here, when the user desires to increase only the visibility of the first person 801, it is inconvenient for the user that the expansion of the gradation of the second person 802 reduces the gradation of the first person 801 whose visibility is desired to be increased. FIG. 9 illustrates a state where the input-output characteristic control in accordance with the level of importance is performed. If the user sets the level of importance of the first person high, then the gradation allocated to the first person will increase than usual, so that the visibility can be further increased.

(3-A) Importance Level Determination by User Input

Using FIG. 6, a flow through which a user determines the level of importance using a user interface is described. When the user sets the priority of a subject using a user interface, such as a dial or a button, in the importance level determination section 601, the subject recognition section 105 determines the level of importance using this priority and outputs it to the input-output characteristic control section 104. The input-output characteristic control section 104 controls the input-output characteristic using the subject information acquired from the subject recognition section 105. Note that, in the example of the system configuration of FIG. 6, neither a user interface nor an LCD monitor is illustrated, however the system configuration shall include all the constituent elements of an ordinary video camera or a still camera.

Figure 10:
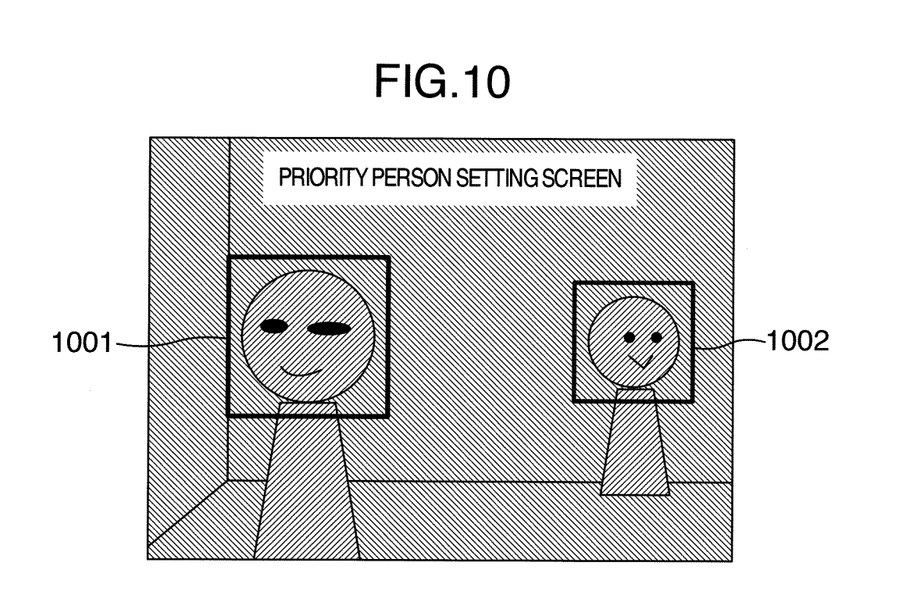
FIG. 10 is a view illustrating an example of an importance level determination method by a user.

Using FIG. 10, a method of determining the level of importance by a user input is described. Once the user carries out a subject-priority setting menu using a user interface, the importance level determination section 601 displays frames as illustrated in FIG. 10 on an LCD monitor. Then, a frame 1001 displayed on a person whom the user is selecting is emphasized and a frame 1002 displayed on the other person is displayed in a more unobtrusive color than the frame 1001. Every time the user performs the key operation of the user interface, the frame to be emphasized switches. The user sets the priority to the person being selected. Once the priority is set, the importance level determination section 106 determines the level of importance from the priority.

The above-described units enable the user to set the level of importance of the subject in the scene in which a plurality of subjects are present.

(3-B) Importance Level Determination Using Subject Information which the Subject Recognition Processing Section Outputs Using FIG. 6, a flow to determine the level of importance using the subject information which the subject recognition processing section outputs is described. The importance level determination section 601 reads the location of the subject from the subject information which the subject recognition section 105 outputs, and calculates the distance from the center of the screen. Subsequently, the level of importance is determined in accordance with the calculated distance. For example, the shorter the distance, the higher the level of importance is set. In this case, instead of the distance from the center of the screen, the size of the subject may be read from the subject information and used in determining the level of importance. For example, the larger the subject, the higher the level of importance is set. Moreover, recognition reliability may be read from the subject information which the subject recognition section 105 outputs, and this recognition reliability may be used in determining the level of importance. Here, the recognition reliability refers to a value which varies with recognition accuracy. For example, the higher the recognition reliability is, the higher the level of importance is set.

The above-described units enable to automatically set the level of importance of the subject in the scene in which a plurality of subjects are present.

(4) Setting of an Upper Limit Number of Subjects Subjected to the Input-Output Characteristic Control In cases where a plurality of subjects are viewed in a video, if the gradations of all the subjects are expanded, then an effect of the gradation expansion with respect to each subject may decrease. In order to solve this problem, the level of importance can be used. For example, if a subject upper limit number is set and a number of subjects with higher level of importance not exceeding this upper limit number are selected and the gradations of only the selected subjects are expanded, then only the gradations of the subjects of high level of importance are expanded and the visibility can be improved. In addition to this, a threshold value may be set such that the gradation expansion is not performed if the level of importance is lower than this threshold value.

Figure 11:
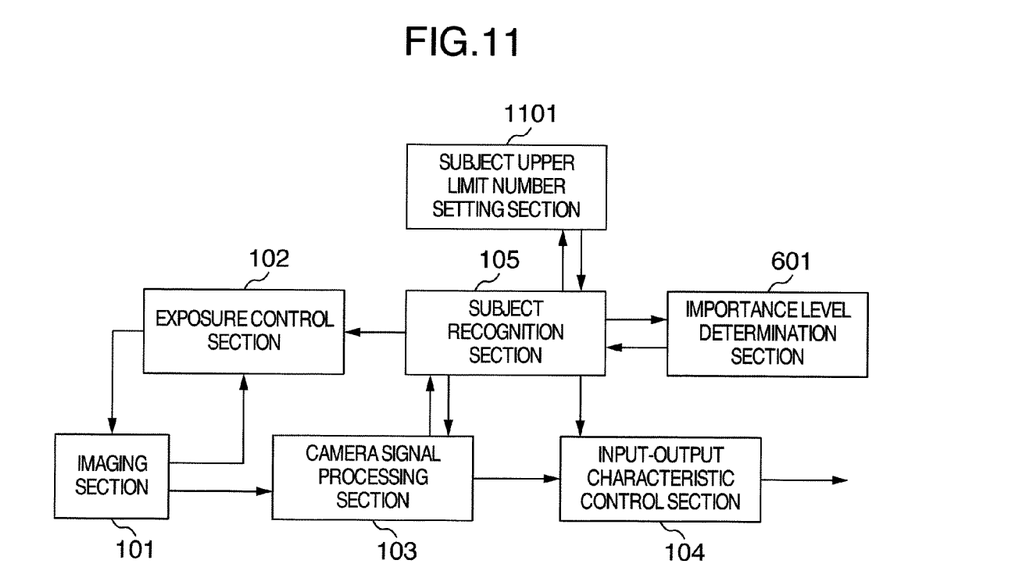
FIG. 11 is a diagram illustrating an example of a system configuration including a unit for setting an upper limit number of subjects subjected to the input-output characteristic control.

FIG. 11 is a diagram illustrating an example of a system configuration including a unit for setting the upper limit number of subjects subjected to the input-output characteristic control. In the following, a method using the upper limit number of subjects is described. A subject upper limit number setting section 1101 is for setting the upper limit number of subjects whose gradation is to be expanded. For example, once the user sets the subject upper limit number using a user interface, the subject upper limit number setting section 1101 outputs the set value to the subject recognition section 105. The subject recognition section 105 outputs a number of pieces of subject information not exceeding the upper limit number, in descending order of the level of importance obtained by the importance level determination section 601, to the input-output characteristic control section 104. The input-output characteristic control section 104 performs the input-output characteristic control in accordance with these pieces of subject information. Note that, in a method using a threshold value, the user sets the threshold value in the subject upper limit number setting section 1101. The input-output characteristic control section performs the gradation expansion on a subject whose level of importance is higher than this threshold value. In the example of the system configuration of FIG. 11, neither the user interface nor an LCD monitor is illustrated, however the system configuration shall include all the constituent elements of an ordinary video camera or a still camera.

(5) Displaying a Frame onto a Subject

Figure 12:
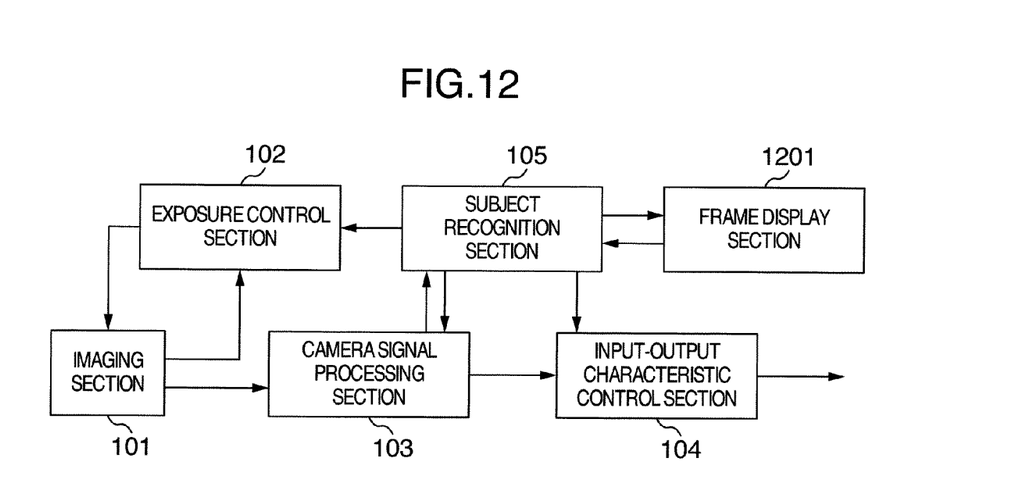
FIG. 12 is a diagram illustrating an example of a system configuration for displaying a frame onto a subject.

FIG. 12 is a diagram illustrating an example of the system configuration for displaying a frame onto a subject. A frame display section 1201 displays a frame onto the periphery of a subject using the result of the input-output characteristic control which has been performed using the subject information generated by the subject recognition section 105. For the subject onto which the frame is displayed, the frame may be displayed onto a subject whose gradation has not been expanded by the input-output characteristic control section 104, or the frame may be displayed onto a subject whose gradation has been expanded. If the user can switch these options, the usability will improve. In addition to this, the subject onto which the frame is displayed may be changed in accordance with the level of importance which the importance level determination section 601 determines. For example, if a frame is displayed onto a subject of high level of importance, the visibility of the subject of high level of importance will improve.

Figure 13:
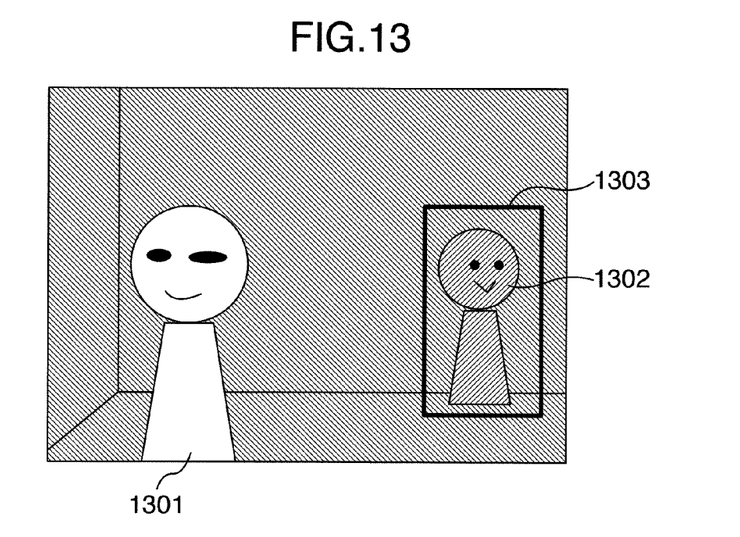
FIG. 13 is a view illustrating an effect of displaying a frame onto a subject whose gradation has not been expanded by an input-output characteristic control section 104.

FIG. 13 is a view illustrating an effect of displaying the frame onto a subject whose gradation has not been expanded by the input-output characteristic control section 104. A first subject 1301 is in a state where the gradation is expanded by the input-output characteristic control while a second subject 1302 is in a state where the expansion of gradation by the input-output characteristic control has not been applied. According to this example, by displaying a frame 1303 onto the periphery of the second subject 1302, an improvement in the visibility of the subject can be achieved in addition to the improvement in the visibility due to the expansion of gradation. Moreover, if the user can arbitrarily set the color of the frame 1302, the usability will improve.

The above-described unit can increase the user visibility even for the subject whose gradation could not be expanded.

(6) Other Input-Output Characteristic Control

Figure 14:
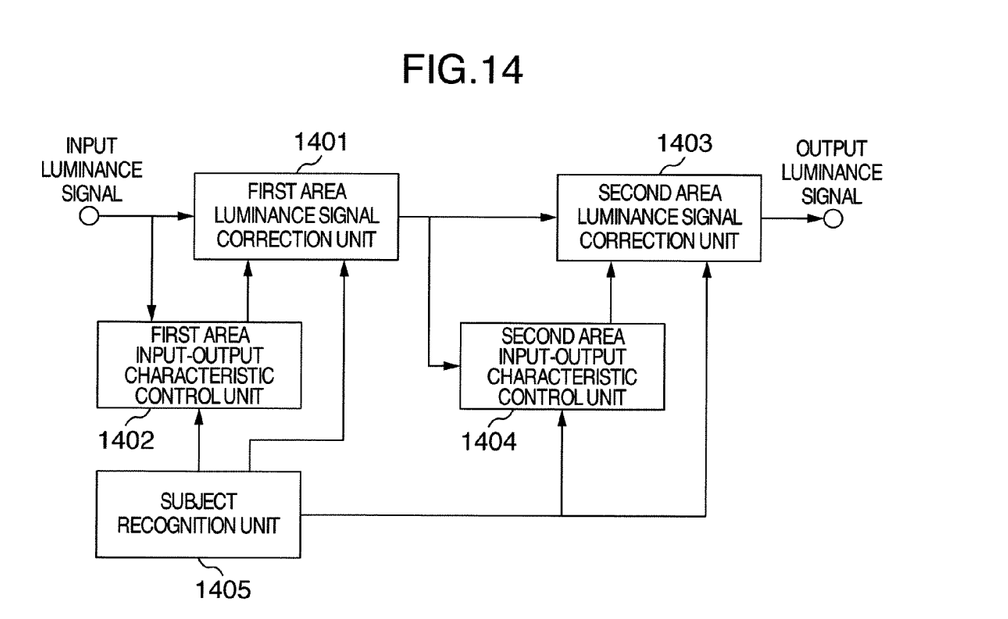
FIG. 14 is a diagram illustrating the concept of Example 2 in the present invention.

Approaches other than the above-described input-output characteristic control method are described in the following. FIG. 14 is a diagram illustrating the concept of Example 2 in the present invention.

A first area luminance signal correction unit 1401 corrects the input-output characteristic of input luminance signals for each small area in accordance with the output of a first area input-output characteristic control unit 1402. The first area input-output characteristic control unit 1402 performs, in an arbitrary small area in an image, a control for varying the input-output characteristic using information about such a local area including the peripheral pixels of this area.

Figure 15:
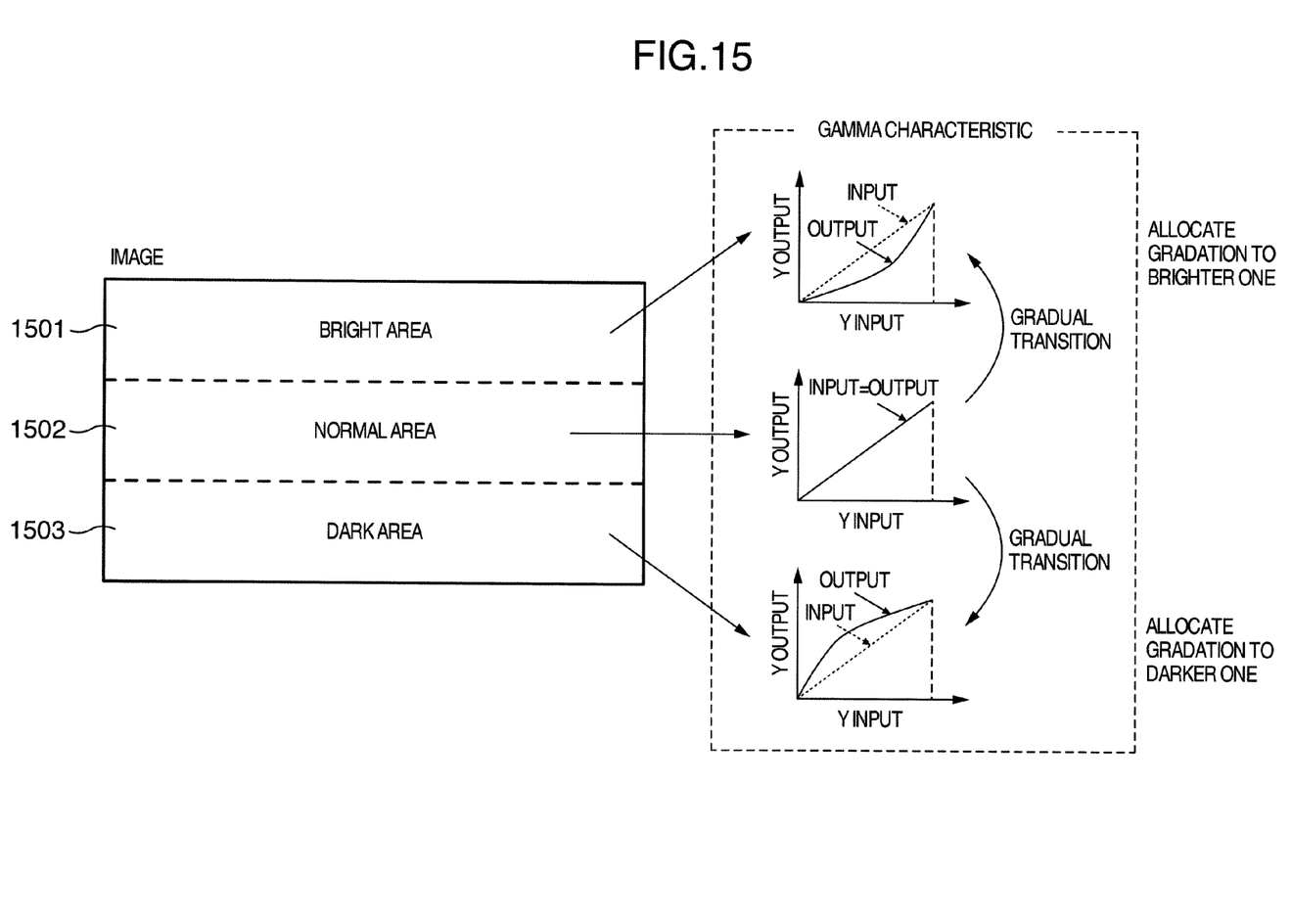
FIG. 15 is a diagram illustrating an example representing the concept of a first area luminance signal correction/input-output characteristic control unit.

FIG. 15 is a view illustrating an example representing the concept of the first area luminance signal correction/input-output characteristic control unit. On the left side of the view, there are shown a dark area 1503 which is blocked up shadows, a bright area 1501 which is blown out highlights, and a normal area 1502 whose gradation is originally clear. Moreover, on the right side of the view, there are shown the input-output characteristics for improving the contrast of the respective areas.

The first area input-output characteristic control unit 1402 (FIG. 14) determines, from the information about a local area, the brightness of a small area as that of either one of three areas such as the dark area 1503, the normal area 1502, and the bright area 1501 as shown on the left side of FIG. 15, and selects the individual input-output characteristic that improves the contrast as illustrated on the right side of FIG. 15. In this manner, the information about the local area is used in determining the brightness, so that an abrupt change in the input-output characteristic due to the effect of noise can be suppressed.

A second area luminance signal correction unit 1403 (FIG. 14) corrects the input-output characteristic of luminance signals in accordance with the output of a second area input-output characteristic control unit 1404 (FIG. 14).

The second area input-output characteristic control unit 1404 (FIG. 14) performs, from the output of the second area luminance signal correction unit 1401 (FIG. 14), a control for uniformly varying the input-output characteristic for each arbitrary image area.

A subject recognition unit 1405 recognizes a subject in a video image and generates subject information. This subject information is used in performing the input-output characteristic control in the first area luminance signal correction unit 1401, the first area input-output characteristic control unit 1402, the second area luminance correcting unit 1403, and the second area input-output characteristics unit 1404. For example, the area of the subject recognized by the subject recognition unit is used as a small area to be controlled by the respective units 1401-1404.

Figure 16:
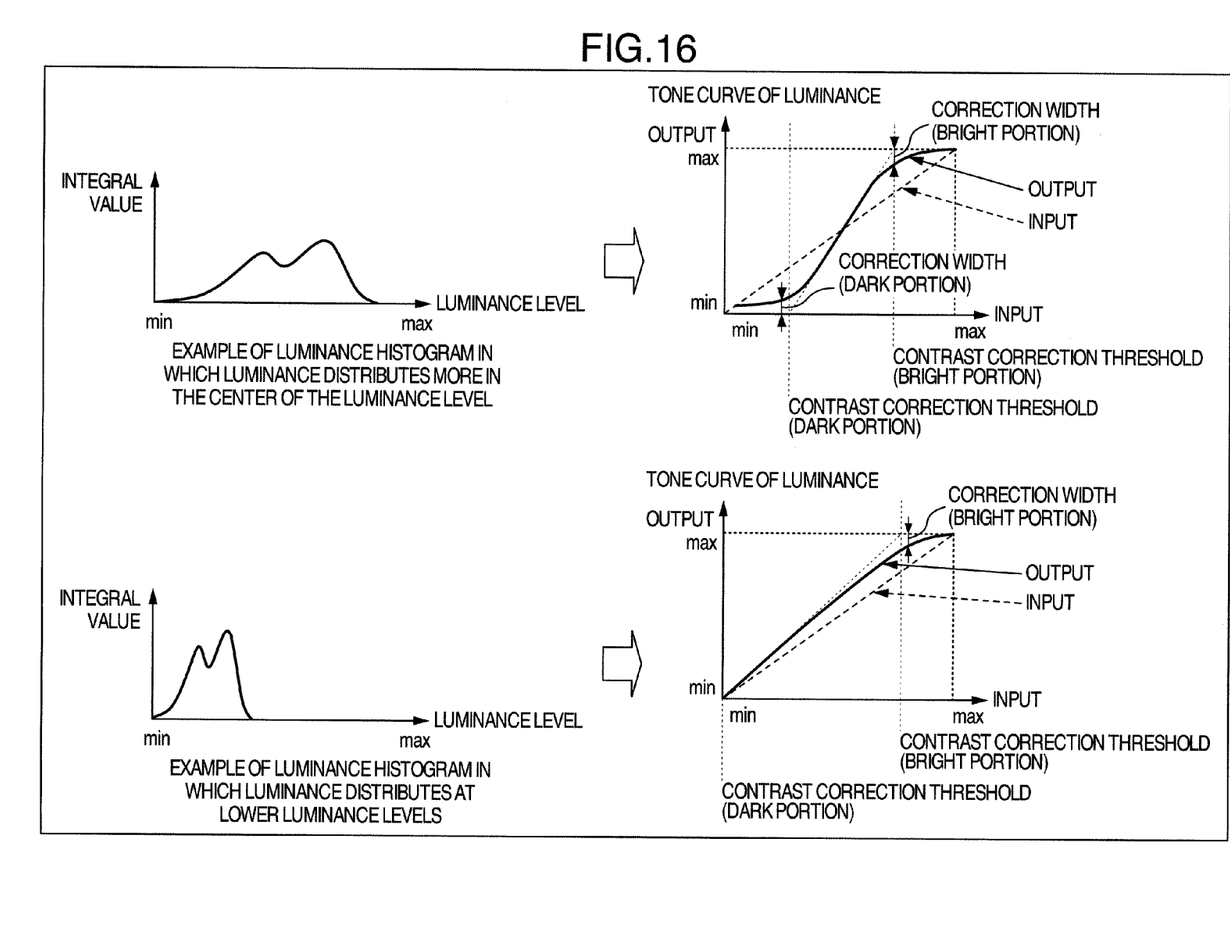
FIG. 16 is graphs illustrating an example representing the concept of a second area luminance signal correction/input-output characteristic control unit.

FIG. 16 is a graph illustrating an example representing the concept of the second area luminance signal correction/input-output characteristic control unit. This unit, from an arbitrary image area, extracts the feature of the image using a luminance histogram or the like and then varies the input-output characteristic across the screen so as to provide the gradation of the feature portion. As the feature of an image, when luminance distributes mostly in the center of a screen, it is determined that the feature is distributed at an intermediate luminance level and the distribution of the feature at the low luminance and high luminance levels is small. The input-output characteristic has S-characteristics or the like which suppress the gradation at the low luminance and high luminance levels and expand the gradation at the intermediate luminance level. Moreover, when luminance is distributed at the low luminance level, it is determined that the feature is distributed in the low luminance portion and the distribution in the high-luminance portion is small. This input-output characteristic causes changes so as to expand the gradation of the low luminance portion and suppress the gradation of the high-luminance portion whose distribution is originally small. In this manner, the portion having a small distribution and the potion having a large distribution are determined from the luminance distribution of input signals, and the shape or the gradient of a tone curve is adjusted in accordance with the feature of this distribution, so that a high contrast in the feature portion of the image is achieved by making efficient use of the portion having a small distribution in the signals.

In the foregoing, the preferred examples of the present invention have been described with reference to the accompanying drawings. According to the present invention, in a digital video camera or a still camera, even in photographing a scene having a significant difference in brightness, the occurrence of blocked up shadows or blown out highlights is suppressed by expanding the gradation, and at the same time the gradation of a specific subject that the user desires to view is expanded with priority so that the visibility can be improved.

Note that the present invention is not limited to the above-described examples, and includes various modifications. For example, the above-described examples have been described in detail for ease of understanding the present invention, and are not necessarily limited to the ones including all the described configurations. Moreover, a part of the configuration of a certain example can be replaced with the configuration of another example, and also the configuration of another example may be added to the configuration of a certain example. Moreover, another configuration may be added or deleted or replaced with respect to a part of the configuration of each example.

A part or all of the respective configurations, functions, processing sections, processing units, and the like may be implemented in hardware by designing an integrated circuit or the like. Moreover, the above-described respective configurations, functions, or the like may be implemented in software according to which a processor interprets and executes programs realizing the respective functions. The information, such as the program, a table, or a file, for realizing each function can be placed on a recording device, such as a memory, a hard disk, or an SSD (Solid State Drive), or on a recording medium, such as an IC card, an SD card, or a DVD.

For the control lines or information lines, the ones which are considered necessary for the description are shown, but all the control lines or information lines required for the product are not necessarily shown. Actually, almost all configurations shall be assumed to be coupled to each other.

The present invention can be applicable to all the digital video cameras and still cameras regardless of for consumer use, monitoring use, on-vehicle use, and business use.

The invention claimed is:

1. An image signal processing system, comprising: a video input means,
    a video signal processing means which performs signal processing on a signal output from the video input means and generates a video signal;
    an input-output characteristic control means which controls characteristic of the video signal that the video signal processing means generates; and
    a subject recognition means which performs image processing on the video signal that the video signal processing means generates, and recognizes and detects subject information,
    wherein the input-output characteristic control means uses the subject information recognized by the subject recognition means in controlling the input-output characteristic;
    a first area input-output characteristic control means which controls a change in an input-output characteristic for each arbitrary area of a plurality of arbitrary areas, interlocked with a value of an input luminance signal;
    a first area luminance signal correction means which varies an input-output characteristic of a luminance signal in accordance with an output of the first area input-output characteristic control means;
    a second area input-output characteristic control means which controls a change in an input-output characteristic for each arbitrary area, interlocked with an output of the first area luminance signal correction means; and
    a second area luminance signal correction means which varies an input characteristic of the luminance signal in accordance with an output of the second area input-output characteristic control means.

2. The image signal processing system according to claim 1, further comprising:
    an imaging means as the video input means,
    a camera signal processing means, as the video signal processing means, which performs camera signal processing on a signal output from the imaging means and generates a video signal;
    an input-output characteristic control means which controls an input-output characteristic of the video signal that the camera signal processing means generated; and
    a subject recognition means which performs image processing on the video signal that the camera signal processing means generated, and recognizes and detects subject information,
    wherein the input-output characteristic control means uses the subject information recognized by the subject recognition means in controlling an input characteristic.

3. The image signal processing system according to claim 1, wherein the input-output characteristic control refers to controlling a gradation of a video image.

4. The image signal processing system according to claim 1, wherein based on the subject information that the subject recognition means generates, the input-output characteristic control means varies a size of an area and a number of areas used in the input-output characteristic control, and varies an input-output characteristic for each area.

5. The image signal processing system according to claim 1, wherein based on the subject information that the subject recognition means generates, amount of changes in the input-output characteristic with respect to a subject and other areas are controlled in the input-output characteristic control means.

6. The image signal processing system according to claim 1, wherein based on the subject information that the subject recognition means generates, an amount of change in the input-output characteristic in the input-output characteristic control means is controlled.

7. The image signal processing system according to claim 6, wherein an amount of input-output characteristic control in the input-output characteristic control means is determined in accordance with a distance from a center of a screen to a subject.

8. The image signal processing system according to claim 6, wherein an amount of input-output characteristic control in the input-output characteristic control means is determined in accordance with a size of a subject.

9. The image signal processing system according to claim 1, further comprising:
a priority determination means which determines a priority of a subject; and
a subject importance level determination means which determines a level of importance for each subject in accordance with a priority determined by the priority determination means when a plurality of subjects are recognized by the subject recognition means.

10. The image signal processing system according to claim 9, wherein a distance from a center of a screen to a subject is used in determining the level of importance in the subject importance level determination means.

11. The image signal processing system according to claim 9, wherein in determining the level of importance in the subject importance level determination means, a size of a subject is used.

12. The image signal processing system according to claim 9, wherein based on the level of importance that the subject importance level determination means determines, an amount of change in the input-output characteristic in the input-output characteristic control means is controlled.

13. The image signal processing system according to claim 9, wherein based on the level of importance that the subject importance level determination means determines, a number of subjects subjected to the input-output characteristic control in the input-output characteristic control means is determined.

14. The image signal processing system according to claim 1, further comprising a subject upper limit number determination means which determines an upper limit number of subjects subjected to the input/output control by the input-output characteristic control means.

15. The image signal processing system according to claim 14, further comprising a threshold value determination means which determines a threshold value used to determine the upper limit number of subjects subjected to the input/output characteristic control by the input-output characteristic control means,
wherein in determining the upper limit number of subjects by the subject upper limit number determination means, the threshold value is used.

16. The image signal processing system according to claim 1, further comprising a frame display means which displays a frame onto a periphery of a subject based on the subject information that the subject recognition means generates.

17. The image signal processing system according to claim 16, wherein the subject around which the frame is displayed by the frame display means is determined based on the level of importance.

18. The image signal processing system according to claim 16, wherein the subject around which the frame is displayed by the frame display means is determined in accordance with an amount of change in the input-output characteristic by the input-output characteristic control means.

* * * * *